March 3, 1964  E. S. KARSTENS  3,122,840
PRECISION LEVELING DEVICE
Filed Aug. 8, 1960  4 Sheets-Sheet 4
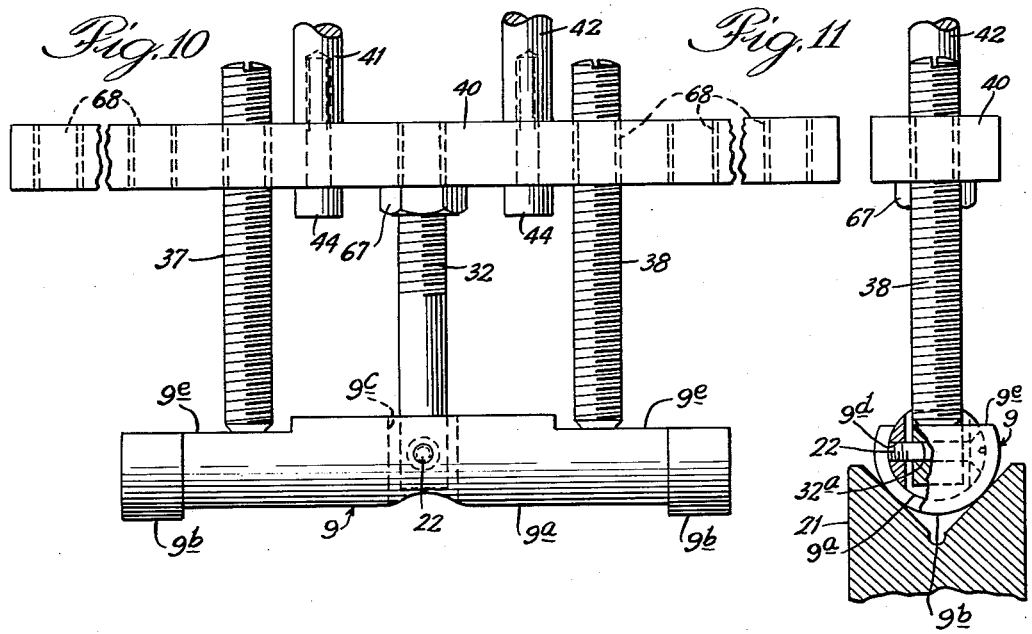
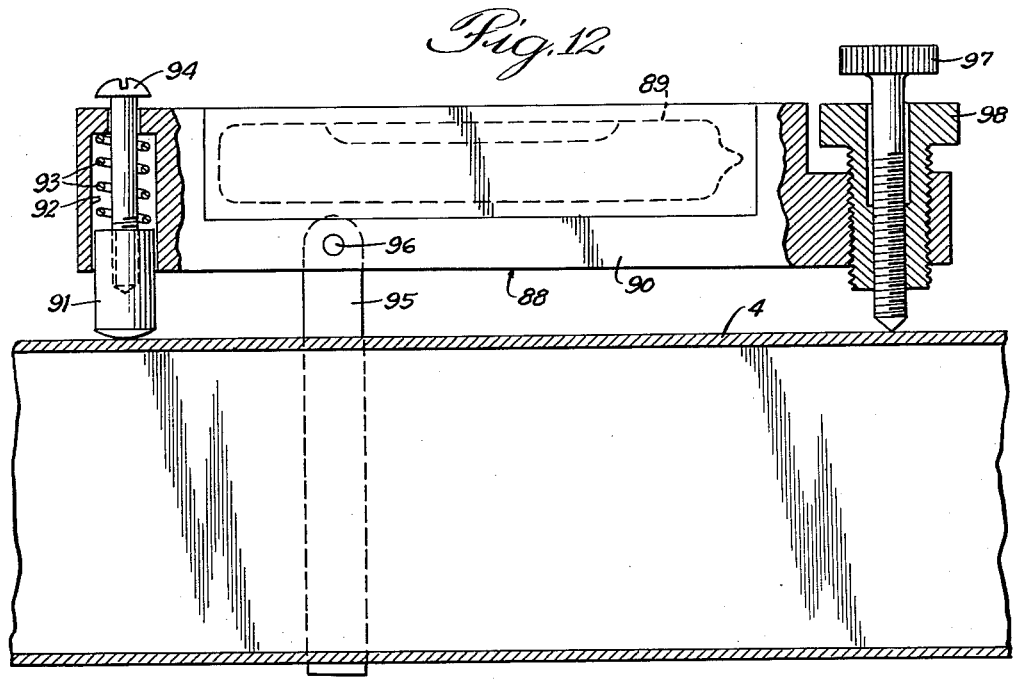
INVENTOR:
Edward S. Karstens,
BY Bair, Freeman & Molinare
ATTORNEYS.

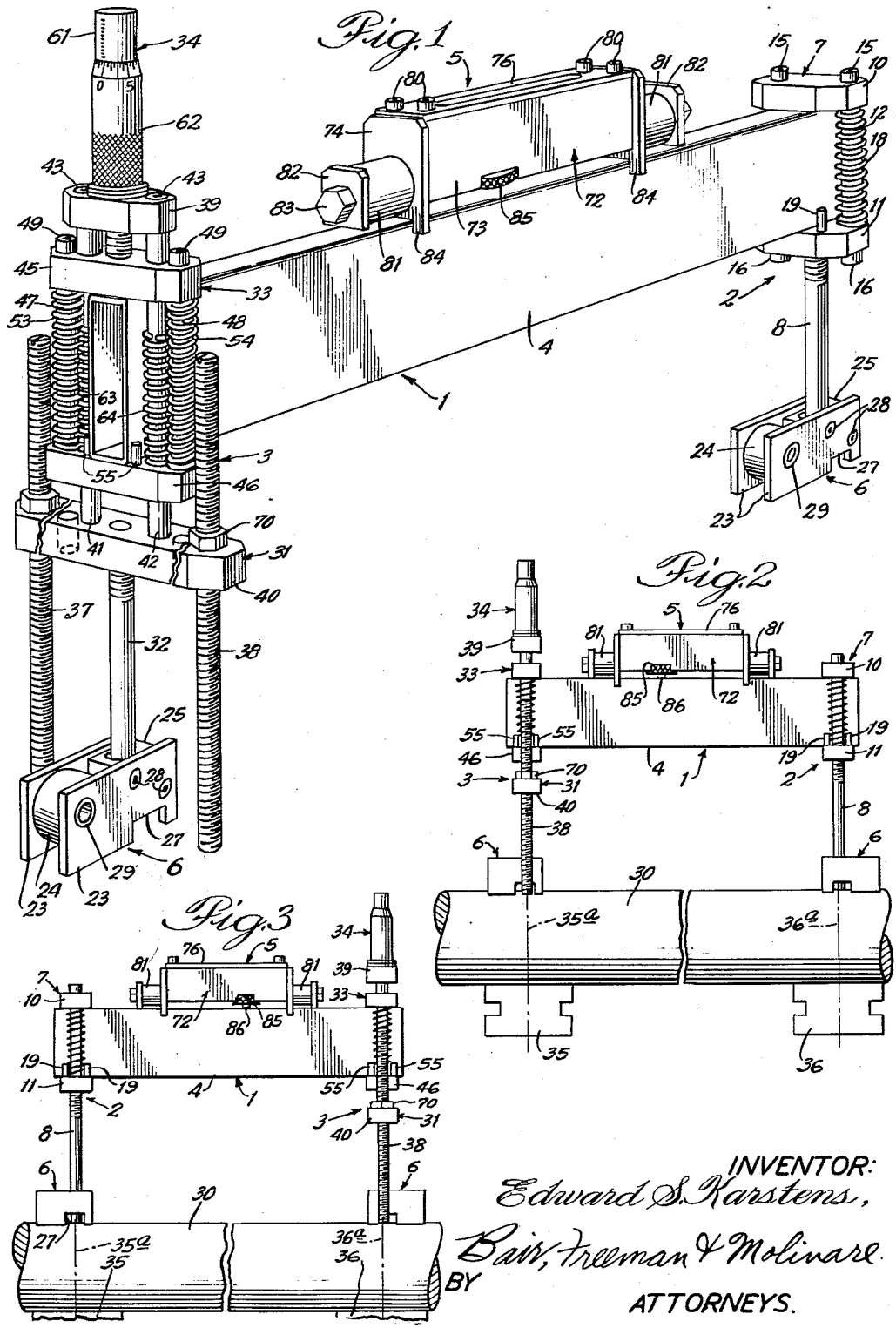

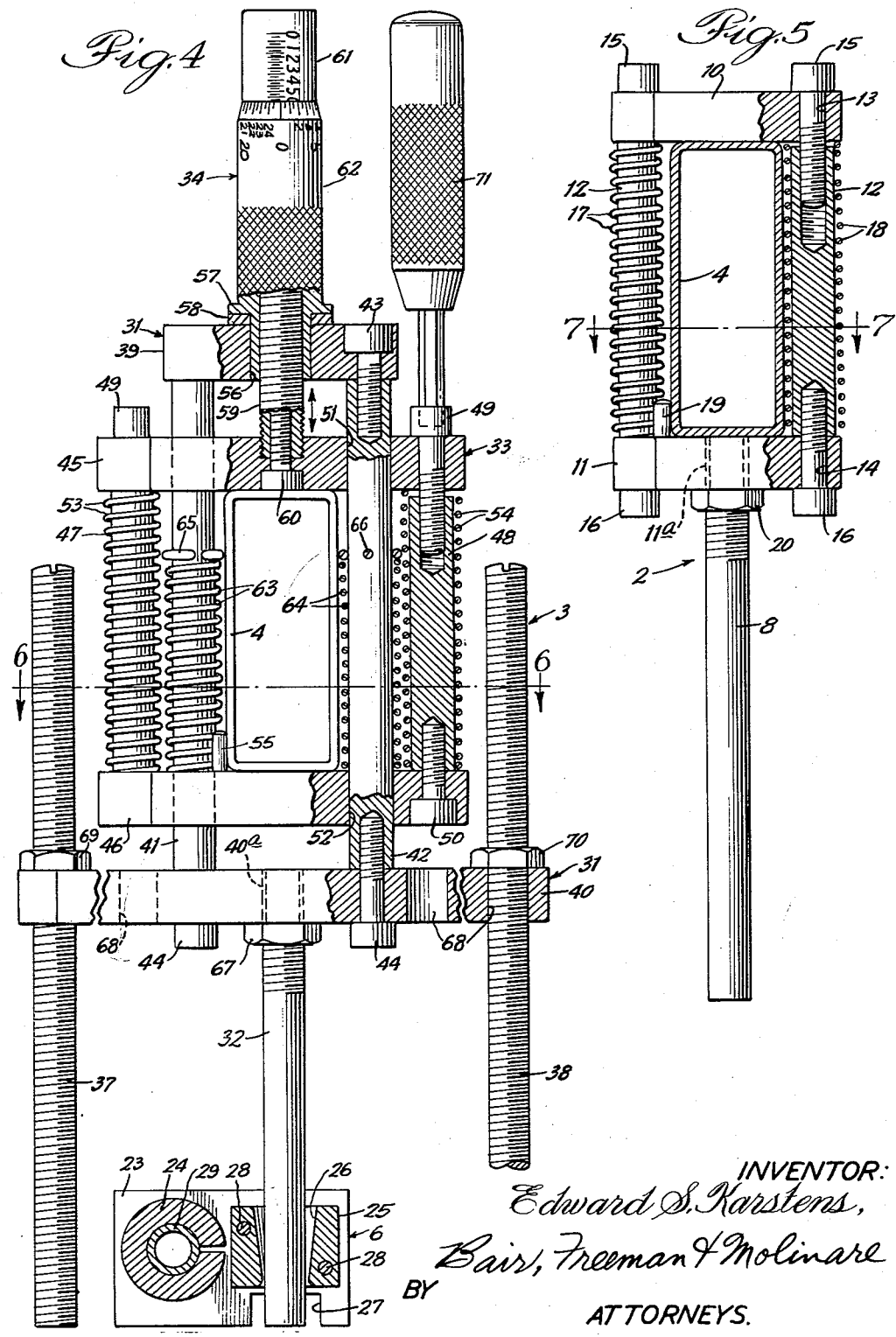

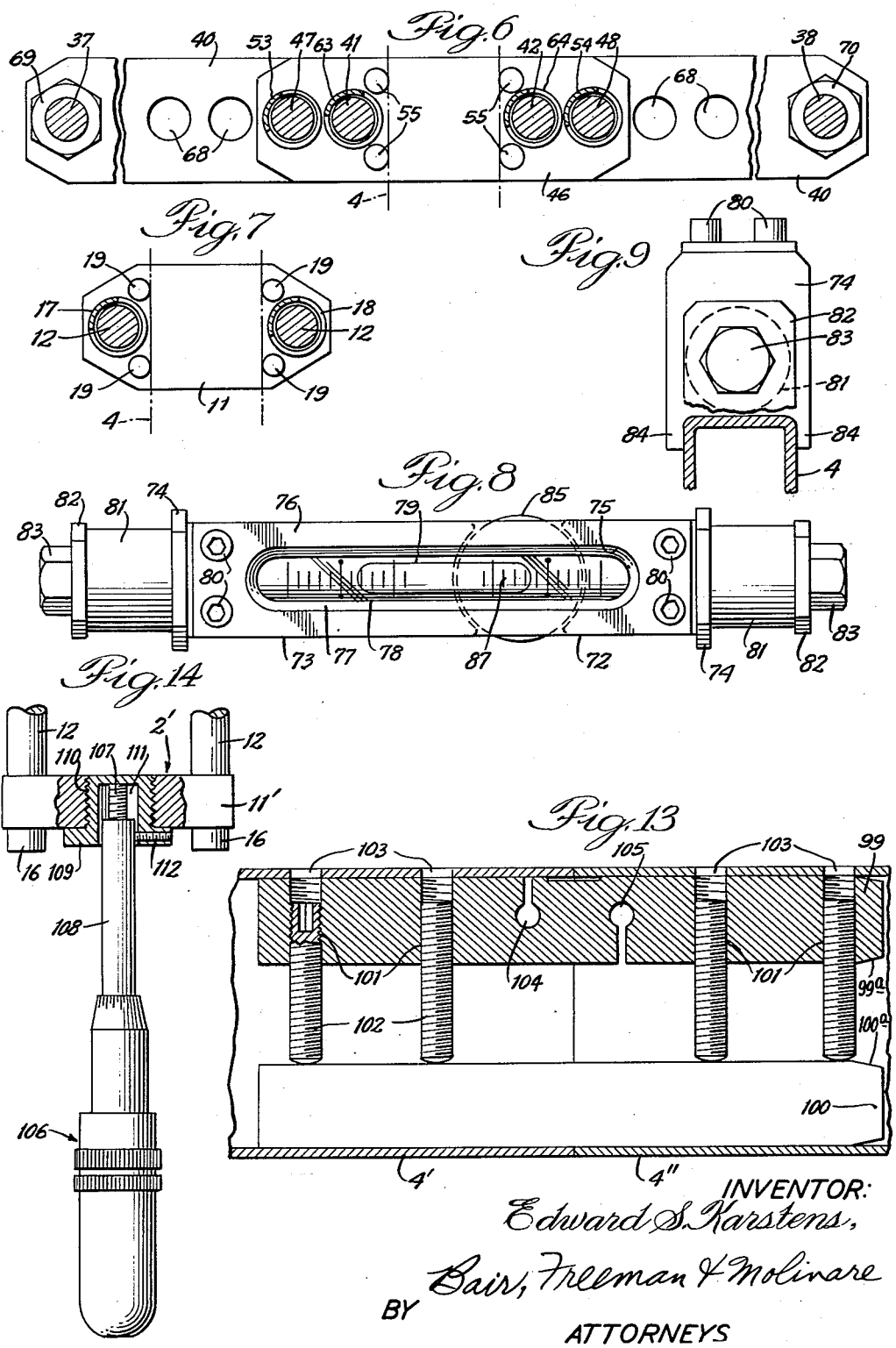

United States Patent Office 3,122,840
Patented Mar. 3, 1964

3,122,840
PRECISION LEVELING DEVICE
Edward Siegfried Karstens, 1223½ Stutevant St.,
Davenport, Iowa
Filed Aug. 8, 1960, Ser. No. 47,981
2 Claims. (Cl. 33—207)

This invention relates to apparatus adapted for various leveling requirements, and particularly, to precision leveling apparatus and an improved method of leveling.

Much of the prior leveling of machinery, equipment, structures, foundations, supports, and the like has involved laborious and time-consuming procedures, which are often difficult and require excessive equipment, especially when precision leveling is mandatory. Exact leveling is required in many different instances, such as, for example, in the manufacture, assembly, and installation of heavy operating machinery, in the assembly and operation of metal-working machinery, in constructing foundations, in leveling machine surfaces, in leveling and aligning shafts, and in leveling and aligning rolls in paper, sheet steel and aluminum mills.

An important object of the present invention is to provide apparatus adapted for precision leveling in these and numerous other instances.

Another object is to provide simple, compact, and reliable apparatus, which furnishes exact leveling without need for additional devices and equipment.

An additional object is to provide apparatus adaptable to various leveling problems, and particularly, to the different sizes, spacing and surface types encountered.

A particular object is to provide apparatus which levels with micrometer accuracy.

Further objects include the provision of leveling apparatus which may be extended in three directions, eliminates trial and error methods, is self-contained and self-calibrating, and is foolproof and trouble-free.

These and other objects, advantages and functions of the invention will be apparent on reference to the specification and to the attached drawings, in which like reference characters represent like elements in each of the views, and in which:

FIGURE 1 is a perspective view of a preferred embodiment of the leveling apparatus of the invention;

FIGURES 2 and 3 are side elevational views of the embodiment, on a reduced scale, illustrating the alternate positions of the apparatus in leveling a cylindrical shaft or roll;

FIGURE 4 is an enlarged end elevational and partly sectional view of the embodiment;

FIGURE 5 is an enlarged cross-sectional view taken adjacent the opposite end of the embodiment, with parts broken away and in section;

FIGURE 6 is a sectional view taken on line 6—6 of FIGURE 4;

FIGURE 7 is a sectional view taken on line 7—7 of FIGURE 5;

FIGURE 8 is an enlarged plan view of the leveling means provided in the embodiment;

FIGURE 9 is an enlarged end elevation of the leveling means, with parts broken away, in place on a leveling bar;

FIGURE 10 is an end elevational view illustrating an assembly of the apparatus for leveling V-ways, employing an adapter;

FIGURE 11 is a side elevational view of the assembly of FIGURE 10, mounted in a V-way;

FIGURE 12 is a side elevational and partly sectional view of another embodiment of the leveling means;

FIGURE 13 is a side elevational and partly sectional view of preferred apparatus for coupling sections of a leveling bar; and FIGURE 14 is an enlarged fragmentary, partly sectional view like FIGURE 5 of another embodiment of a pedestal adapted for offset leveling.

The leveling apparatus of the invention includes as component parts, a plurality of pedestals, a leveling bar mounted on the pedestals, and a level mounted on the bar. One of the pedestals is a jack pedestal. It includes a holder for the bar, and graduated means for raising and lowering the holder. The holder engages the bar for raising and lowering the bar therewith. Another pedestal may also include graduated means for raising and lowering the bar, for use in offset leveling.

In a preferred embodiment of the invention, a micrometer is employed as the graduated means for raising and lowering the holder. The pedestals preferably include a support leg which is centered under the bar. The apparatus preferably includes stabilizing means which maintain the apparatus upright in the process of making measurements and adjustments, with the pedestal legs supporting the remainder of the apparatus. It is also preferred to provide locating wells for the pedestal legs, to locate and hold the legs at the proper positions for leveling. It is further preferred that the level be removably mounted on the bar.

Referring to the drawings, the leveling apparatus is generally indicated by the numeral 1 in FIGURE 1. The apparatus includes a fixed pedestal 2, a jack pedestal 3, a leveling bar 4, leveling means 5, and a pair of locating wells 6. The leveling bar 4 is mounted on the fixed pedestal 2 so that it maintains a constant position with respect to the surface beneath the fixed pedestal. The leveling bar is mounted on the jack pedestal 3 so that it may be moved up and down with respect to the surface beneath the jack pedestal, together with the leveling means 5 mounted on the bar, until a level reading is indicated by the leveling means.

The fixed pedestal 2 includes a clamping frame or bar holder 7 mounted on a central threaded vertical leg or standard 8. The leg at times may be located in one of the locating wells 6, or in an adapter 9 (FIGURES 10 and 11). The frame 7 includes upper and lower horizontal yoke bar members 10 and 11 connected together by a pair of spaced parallel vertical tie rods 12, which straddle the leveling bar 4 when it is secured in the clamping frame 7. The upper and lower yokes 10 and 11 are provided with pairs of holes 13 and 14, respectively, in alignment with the tie rods (see FIGURE 5). Cap screws 15 and 16 are inserted through the holes 13 and 14, respectively, and threadedly engage the interior of the opposite ends of the tie rods 12 to secure the frame. Four vertical locating pins 19 (see FIGURE 7) are mounted on the lower yoke 11, extend upwardly and straddle the leveling bar 4 on both sides of the tie rods 12, to center and hold the bar.

The yokes 10 and 11 are secured to the tie rods 12 against the tension of coil compression springs 17 and 18 which surround the respective rods. When it is desired to change the position of the pedestal 2 or adjust the levelling bar 4, the tension of the springs separates the yokes 10 and 11 upon loosening the screws 15 or 16.

The leg 8 of the pedestal 2 is threaded into a central opening 11a in the lower yoke 11. It is located in position by a jam or lock nut 20, as illustrated in FIGURE 5. Legs of various lengths may be substituted for more or less straddle clearance. The leg may be positioned in one of the locating wells 6 (see FIGURE 1) which has been located on the surface being leveled in an appropriate position. The locating well is employed most advantageously on flat and convex surfaces, and it may also be employed on certain concave and other surfaces.

The locating wells 6 include a pair of parallel vertical side plates 23 constructed of magnetic metal, and a permanent magnet 24 and a guide block 25 secured between the plates. As illustrated in FIGURE 4, the guide block is provided with a central vertical inwardly tapering or conical bore 26 through which the pedestal leg 8 extends onto the surface being leveled. Access openings 27 are provided by cutting away portions of the metal plates at their bases adjacent the foot of the pedestal leg, for inserting a feeler gauge under the leg. The guide block 25 is secured between the plates by means of screws 28 or other fastening means. The magnet 24 is secured between the metal plates 23 by a non-magnetic tubular rivet 29 or other fastening means.

The purpose of the magnet is to hold the locating well 6 in its desired position upon a metal surface to be leveled. The pedestal leg 8 when inserted is likewise held in position. If desired, the locating well 6 may be constructed to stabilize the remainder of the leveling apparatus 1 while making readings and adjustments.

In the construction of the locating well 6, the magnet 24 and the guide block 25 are spaced above the base of the metal plates 23, to adapt the well for mounting on a concave surface, or on other surfaces which are not flat. FIGURES 2 and 3 illustrate the locating wells mounted on a cylindrical shaft or roll 30 over the center lines 35a and 36a of two shaft bearings 35 and 36. The magnet 24 is especially advantageous in the leveling of such surfaces, preventing the wells and the apparatus from sliding or falling off of the surface.

The jack pedestal 3 includes a stanchion 31 mounted on a central threaded leg or standard 32, a clamping frame or bar holder 33 which is vertically reciprocable on the stanchion, and a micrometer or graduated means 34 mounted on the standchion. In addition, a pair of vertically arranged threaded rod stabilizers or outriggers 37 and 38 are connected to the stanchion 31. These members serve to stabilize the remainder of the apparatus 1 while making readings and adjustments. They may be connected, alternatively, to the frame 7 of the fixed pedestal 2. It is also possible to employ other arrangements for stabilizing the apparatus. However, it is preferred to provide the stabilizing means in association with the jack pedestal when the micrometer 34 is mounted in the manner illustrated.

The stanchion 31 is composed of upper and lower horizontal bar members 39 and 40, connected by a pair of vertical stanchion tie rods 41 and 42, which straddle the leveling bar 4 when the apparatus is assembled. The members are connected by means of upper flush screws 43 and lower cap screws 44 (see FIGURE 4), which are inserted through corresponding openings in the upper and lower stanchion bars 39 and 40, and are threaded into the ends of the stanchion tie rods.

The reciprocable or movable frame 33 includes upper and lower horizontal yoke bar members 45 and 46, connected by vertical tie rods 47 and 48, which straddle the stanchion tie rods 41 and 42. The members are fastened together and clamped on the leveling bar 4 by upper cap screws 49 and lower flush screws 50. The screws are inserted through corresponding openings in the yokes, and extend into the ends of the tie rods in threaded engagement therewith.

The movable frame 33 slides in the vertical direction on the stanchion tie rods 41 and 42, and it is moved up and down by means of the micrometer 34. Each of the movable frame yokes 45 and 46 is provided with a pair of openings 51 and 52 respectively, through which the stanchion tie rods extend.

The movable frame yokes 45 and 46 are secured to the frame tie rods 47 and 48 against the tension of coil compression springs 53 and 54 which surround the respective rods, for the same purpose as previously described in connection with the springs 17 and 18 of the fixed frame 7. In the same manner as described in connection with the fixed pedestal 2, four vertical locating pins 55 (see FIGURE 6) are mounted on the lower movable yoke 46 and straddle the leveling bar 4 to center and hold the bar.

The micrometer 34 is mounted on the upper stanchion bar 39 and is connected to the upper movable yoke 45 for moving the frame 33 up and down. The upper stanchion bar is provided with a central cylindrical opening 56 in which is mounted a flanged end 57 of a micrometer thimble 62. The thimble end is seated on a washer 58 on the bar. A micrometer spindle or screw shaft 59 is in internal threaded engagement with the thimble 62. The spindle is connected to the upper movable yoke 45 by means of an anchor screw 60 extending through the yoke and into the center of the micrometer spindle, in internal threaded engagement therewith.

The spindle 59 is integral with a vertically graduated barrel 61. The thimble 62 is circumferentially graduated, and readings are taken from the barrel and thimble scales in the conventional manner for a micrometer. When the micrometer thimble 62 is rotated about its vertical axis, the spindle 59 and the barrel 61 move up or down, and the movable frame 33 moves therewith. The position of the frame 33, and the leveling bar 4 movable therewith, is indicated by the readings on the graduated scales.

Two like coil compression springs 63 and 64 are mounted on the respective stanchion tie rods 41 and 42, between the upper and lower movable yokes 45 and 46. The springs are seated on the lower yoke 46, and are held in compression by upper retaining means or rings 65 and 66 which are connected to the stanchion rods. In this manner, the micrometer 34 is maintained under tension, causing the thimble 62 to constantly bear on the upper surface of the flange of the washer 58. This construction insures that the readings obtained are exact, and the thimble is prevented from turning when not intended.

The leg 32 of the jack pedestal 3 is threaded into a central opening 40a in the lower stanchion bar 40. The leg 32 and the leg 8 of the fixed pedestal are adjusted so that the leveling bar 4 is horizontal with the micrometer 34 at its mid-point. The leg 32 of the jack pedestal is held in position by a lock nut 67 threaded on the leg. In the same manner as described in connection with the fixed pedestal 2, the leg may be positioned in a second locating well 6.

Alternatively, the adapter 9 may be employed to advantage in leveling one or two V-ways, or the like, as found in planer type machines. FIGURES 10 and 11 illustrate the adapter pivotally mounted on the leg 32 of the jack pedestal, and the adapter is arranged longitudinally in a V-way 21. In leveling two V-ways, a second adapter is mounted on the fixed pedestal leg 8. By turning the adapters 90 degrees, they may be used to level one V-way.

The adapter 9 is a round bar having a reduced partly cylindrical center section 9a, enlarged partly cylindrical end sections 9b, a central transverse vertical bore 9c, and a transverse tapped pivot opening 9d normal to the bore. The pedestal leg 32 (or 8) is received in the bore, and it is provided with a transverse pivot opening 32a adjacent its end. A threaded pivot pin 22 is received in the pivot openings and secures the leg and adapter together, while permitting some rotation of the leg about the pivot, in the bore 9c, to accommodate variations in the angle of the leveling bar relative to the V-way.

The upper end surfaces 9e of the adapter are flat, and the stabilizing rods 37 and 38 bear on the surfaces in leveling V-ways in the manner illustrated. When the adapters are turned 90 degrees for leveling one V-way, the stabilizing rods are adjusted on adjacent surfaces, to hold the apparatus upright. The locating wells 6 may be used for locating the adapters 9, by arranging them against the end sections 9b.

Likewise, when the pedestal leg 32 is in position in a locating well 6 for leveling, the stabilizing rods 37 and 38 are adjusted to hold the apparatus upright. The stabilizing rods engage the lower stanchion bar 40 in threaded openings 68 in the bar. A number of openings are provided, and the bar may be as long as desired, for close or widespread bases for the rods, as the case may be. The rods are moved up or down as necessary, and are then secured in position by lock nuts 69 and 70 in threaded engagement with the respecitve rods.

The leveling bar 4 is preferably a rectangular tube constructed of magnetic metal, or it may be composed of a plurality of tubular sections joined together at their ends, depending upon the distance between the points to be levelled. The extensible leveling bar construction is subsequently described with reference to FIGURE 13.

In assembling the apparatus, the locating wells 6 are first arranged at the points to be levelled. The pedestals are loosely placed over the ends of the bar 4, and the jack pedestal leg 32 is arranged in one well 6. The leg extends from 0.0005" to 0.001" further than the stabilizing rods 37 and 38, so that the leg supports the leveling bar. The stabilizing rods hold the apparatus upright. The fixed pedesal leg 8 is inserted in the second well 6. The frames 7 and 33 are tightened on the bar against the tension of the respective springs 17 and 18, 53 and 54, by means of the screws 15 and 49. When the movable frame 33 is tightened, the stanchion springs 65 and 66 are also placed in compression. FIGURE 4 illustrates the use of a screwdriver 71 inserted in one of the upper movable frame screws 49 for turning the screw.

When the pedestals 2 and 3 are located and assembled with the leveling bar 4, the leveling means 5 is mounted centrally on the bar. The leveling means includes a level 72 having a non-magnetic body 73 (preferably an aluminum casting), magnetic end plates 74, a metal cover plate 76 having a window opening 75 therein, and a tubular glass vial 78 enclosing a movable bubble 79, constituting a spirit level. The cover plate is secured in position by cap screws 80.

Permanent magnets 81 are connected to the opposite ends of the level 72, by means of magnetic metal plates 82 and non-magnetic (brass) screws 83. The level is held in position on the leveling bar 4 by these magnetic means. Each of the level end plates 74 also includes a pair of legs 84 which form brackets holding the level in proper position on the leveling bar 4. To assist in separating the leveling means 5 from the leveling bar, a thumb jack nut 85 is mounted in the base of the level 72. It is provided with a stud 86 (see FIGURE 2) which forces the level upwardly from the bar when the jack nut is turned.

In a leveling operation, the apparatus preferably is assembled so that the micrometer 34 shows a reading midway between the extremes of the vertical scale when the bar 4 is horizontal. This constitutes a reading of about one-half inch in the preferred embodiment having a one inch long scale. In leveling a shaft or roll, for example in the manner illustrated in FIGURES 2 and 3, the movable frame 33 on the jack pedestal is adjusted by turning the micrometer thimble 62 until the level 72 indicates a level or horizontal position of the leveling bar 4. This is ascertained in the usual manner by the position of the bubble 79 in the center of the scale 87 on the glass vial 78. The reading corresponding to the positions of the reference points for the scales on the micrometer 34 is then noted and recorded. For example, the reading may be .4805".

The position of the leveling apparatus is then reversed, with the fixed pedestal 2 and the jack pedestal 3 transposed. This is illustrated by the change in position from FIGURE 2 to FIGURE 3. The movable frame 33 is once more adjusted by turning the micrometer thimble 62, thus raising or lowering the movable frame and the leveling bar 4 therewith, as the case may be, until the level 72 indicates a level position of the leveling bar. The new micrometer reading is noted and recorded. For example, it may be .5205". The two readings are then subtracted, and the difference is found to be .040". One-half of the difference, .020", is the amount the shaft is out of level on the center lines 35a and 36a of the bearings.

To prove the result, a .020" feeler gauge may be inserted through the access opening 27 in the locating well 6 under pedestal leg 8 (position of FIGURE 3). With the micrometer set at the average of the two readings, .5005", the bubble 79 of the level 72 will be centered beneath the scale 87. The shaft 30 then may be leveled by inserting a .020" shim under the base of the bearing 35.

The leveling operation may be further simplified with the compensating level 88 illustrated in FIGURE 12. In this embodiment, a spirit level vial 89 is mounted in a level body 90. At one end of the body, a leg 91 is movably mounted in an opening 92 against the tension of a compression spring 93, and the leg is secured by an adjusting screw 94 on the body. The level is held on the leveling bar 4 by a yoke 95 secured to the body by a screw hinge pin 96.

At the other end of the level body 90, compensating differential screw means are mounted, and include a coarse adjustment screw 97 threaded concentrically in a fine adjustment screw 98, which is in turn threaded into the level body. The coarse adjustment screw bears on the upper surface of the leveling bar 4. It may be, for example, a ¼" by 20 knurled head screw. The fine adjustment screw may be a ⅝" by 18 knurled head screw, having inner ¼" by 20 threads.

The micrometer 34 is set initially at the .500" reading with the apparatus in one position, e.g., that of FIGURE 2. The coarse screw 97 is turned until an approximately level position is shown by the spirit level 89. While holding the coarse screw from turning the fine screw 98 is turned until a level position is shown by the spirit level.

The leveling operation is completed as described above, by reversing the apparatus as in FIGURE 3 and turning the micrometer thimble 62 until a level position is shown by the spirit level. The subtraction of the readings and calculation of the amount of adjustment necessary for leveling can be done mentally.

For leveling points which are spaced apart for substantial distances, e.g., as much as twenty feet apart, a number of sections 4' and 4" of the leveling bar 4 may be jointed together in the manner illustrated in FIGURE 13. The sections are aligned longitudinally with their ends abutting and secured by means of square coupling bars 99 and 100 having sides which equal the internal width of the sections and having respective tapered ends 99a and 100a. One coupling bar 99 is provided with four tapped openings 101 therethrough, and set screws 102 are received therein. The screws are inserted through two openings 103 adjacent the ends of each of the bar sections 4' and 4", and they bear on the remaining spaced coupling bar 100 to hold the sections aligned together. The coupling bars are secured by two screws 102 within one leveling bar section 4', and then inserted into the abutting section 4" and secured by the remaining screws 102. To provide for variations in the inside dimensions of the leveling bar sections, one coupling bar 99, or both bars, may be drilled and saw cut from opposite sides as indicated at 104 and 105, for flexing in either direction.

In offset leveling, i.e., where two points are to be located at different elevations, the embodiment of an adjustable pedestal 2' shown in FIGURE 14 is very useful. The fixed pedestal leg 8 illustrated in preceding views, as in FIGURE 5, is replaced by a vertically adjustable "inside micrometer" leg 106. This micrometer is preferably set initially at the midpoint of its graduated scales. The apparatus is correlated so that the reading of the micrometer 34 on the jack pedestal 3 is known when the bases of the respective pedestal legs are in a horizontal plane. The inside micrometer 106 is then adjusted to alter the length of the leg an amount equal to the desired difference in elevation, and one point to be leveled is adjusted in elevation until a level reading is obtained. Alternatively, the inside micrometer is used to measure the difference in elevation between two points, and adjustment of the points may be made accordingly. Where the difference exceeds the range of the inside micrometer, a measuring rod may be used as an extension, for example, by fastening the rod to a threaded end 107 on the micrometer barrel 108.

An adapter 109 for the micrometer leg is employed to connect the inside micrometer 106 to the lower yoke 11' on the adjustable pedestal 2'. The adapter is in threaded engagement in a tapped opening 110 in the yoke, and the barrel 108 is secured in a cylindrical recess 111 in the adapter by a set screw 112. The adapter may be employed to secure the rod type pedestal leg 8 in position, or a like adapter may be threaded internally for engagement with a threaded leg.

It will be apparent that the construction and arrangement of the parts can be varied in other ways while still accomplishing the objects of the invention and falling within its scope. For example, the "outside micrometer" 34 on the jack pedestal 3 may be replaced by an "inside micrometer" in the manner illustrated in FIGURE 14, without need for a stanchion. However, the construction illustrated is preferred for versatility, convenience and facility in operation.

Other means may be provided for stabilizing the apparatus, and they may be arranged in other locations. While it is preferred to provide a level which is removably mounted on the leveling bar 4, the level may constitute an integral component of the bar or of a section thereof. It is also contemplated that other types of holders for the leveling bar may be employed. Other graduated means for raising and lowering the bar can be provided, preferably providing micrometer accuracy. The several parts may be constructed, arranged, and secured in other equivalent ways.

The invention thus provides leveling apparatus which is simple in construction and operation, and is especially adapted for precise leveling. The points to be leveled may be close to each other or far apart, in which case a number of sections of the bar 4 are joined together. Legs 8 and 32 of less or greater length may be used, for avoiding overhead obstructions or for straddle clearance. The stabilizing rods 37 and 38 may be close together or spread apart as desired according to the requirements of the situation. The invention removes the guesswork from many leveling operations and eliminates the need for trial and error methods. The apparatus is compact and durable. There is no need for auxiliary equipment or apparatus, owing to the self-contained, self-calibrating and extensible construction.

The invention is hereby claimed as follows:

1. Improved pedestal adjustment means for a leveling apparatus comprising an elongated leveling bar, a level operatively associated with the leveling bar, a pair of legs operatively connected to the leveling bar adjacent the ends thereof for supporting said leveling bar on surfaces to be leveled with respect to one another, and adjustment means for selectively vertically adjusting one end of said leveling bar relative to its support leg; said improved pedestal adjustment means comprising, in combination, a bar member secured to and supported upon one of said support legs, an upright frame extending upwardly from said bar member and defining a pair of upright elongated guides, a clamping frame arranged for sliding movement on said upright guides for vertical movement along said upright frame, said clamping frame being adapted to engage the leveling bar adjacent one end thereof, a micrometer mounted on said upright frame and connected to said clamping frame to both effect selective raising and lowering of the clamping frame and the leveling bar connected thereto relative to said upright frame and to permit reading thereof to accurately and specifically determine the amount of adjustment required to effect leveling.

2. Improved leveling apparatus comprising, in combination, an elongated leveling bar, a pair of pedestals affixed to said leveling bar adjacent the ends thereof and adapted to be mounted on support surfaces to be leveled with respect to one another, one of said pedestals comprising a stationary member having a depending support adapted to be mounted on a support surface, an upright frame extending upwardly from said stationary member and defining a pair of upright elongated guides, a clamping frame arranged for sliding movement along said upright frame, said clamping frame being adapted to engage the leveling bar adjacent one end thereof, and a micrometer mounted on said upright frame and connected to said clamping frame to both effect selective raising and lowering of the clamping frame and the leveling bar connected thereto relative to said upright frame and to permit reading thereof to accurately and specifically determine the amount of adjustment required to effect leveling said micrometer lying in a vertical plane passing through said depending support.

References Cited in the file of this patent

UNITED STATES PATENTS

| | | |
|---|---|---|
| 140,055 | Marston | June 17, 1873 |
| 527,815 | Schnell | Oct. 23, 1894 |
| 711,880 | Ovens | Oct. 21, 1902 |
| 811,739 | Pelfrey et al. | Feb. 6, 1906 |
| 1,132,318 | Feder | Mar. 16, 1915 |
| 1,278,148 | Heusser | Sept. 10, 1918 |
| 1,605,604 | Nerbon | Nov. 2, 1926 |
| 2,178,293 | Wogeck | Oct. 31, 1939 |
| 2,535,791 | Fluke | Dec. 26, 1950 |
| 2,761,217 | King | Sept. 4, 1956 |

FOREIGN PATENTS

| | | |
|---|---|---|
| 242,826 | Great Britain | Nov. 19, 1925 |
| 1,042,956 | France | June 10, 1953 |